United States Patent
Bohling et al.

(10) Patent No.: US 9,354,820 B2
(45) Date of Patent: May 31, 2016

(54) VSAM DATA SET TIER MANAGEMENT

(71) Applicant: GLOBALFOUNDRIES INC., Grand Cayman (KY)

(72) Inventors: Neal E. Bohling, Tucson, AZ (US); David B. LeGendre, Tucson, AZ (US); David C. Reed, Tucson, AZ (US); Max D. Smith, Tucson, AZ (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 74 days.

(21) Appl. No.: 13/930,429

(22) Filed: Jun. 28, 2013

(65) Prior Publication Data

US 2015/0006832 A1  Jan. 1, 2015

(51) Int. Cl.
*G06F 3/00* (2006.01)
*G06F 3/06* (2006.01)

(52) U.S. Cl.
CPC ............ *G06F 3/0644* (2013.01); *G06F 3/0608* (2013.01); *G06F 3/0647* (2013.01); *G06F 3/0685* (2013.01)

(58) Field of Classification Search
None
See application file for complete search history.

(56) References Cited

U.S. PATENT DOCUMENTS

| | | | |
|---|---|---|---|
| 5,269,013 A * | 12/1993 | Abramson et al. | 711/170 |
| 8,370,597 B1 | 2/2013 | Chatterjee et al. | |
| 8,838,931 B1 * | 9/2014 | Marshak et al. | 711/170 |
| 2010/0121828 A1 * | 5/2010 | Wang | 707/694 |
| 2012/0173833 A1 * | 7/2012 | Lehr et al. | 711/165 |
| 2012/0317338 A1 * | 12/2012 | Yi et al. | 711/103 |

OTHER PUBLICATIONS

Breecher, J. "Operating Systems File Systems", Silberschatz, chapters 10 and 11. 43 pages.
IBM, "IBM System Storage® Easy Tier", IBM System Storage DS8000 Information Center. http://publib.boulder.ibm.com/infocenter/dsichelp/ds8000ic/index.jsp?topic=%2Fcom.ibm.storage.ssic.help.doc%2Ff2c_autodatareloc_lfa4gd.html © Copyright IBM Corporation 2004, 2013.
Lazowska, E., "CSE 451: Operating Systems Spring 2005", Module 14 File Systems. May 15, 2005. © 2005 Gribble, Lazowska, Levy.
Lovelace, M., et al., "VSAM Demystified", IBM Redbooks, Mar. 2013, Third Edition, SG24-6105-02. www.ibm.com/redbooks ISBN 0738437433 © Copyright IBM Corp. 2001, 2012, 2013.

* cited by examiner

*Primary Examiner* — Hal Schnee
*Assistant Examiner* — Craig Goldschmidt
(74) *Attorney, Agent, or Firm* — Scully Scott Murphy and Presser

(57) ABSTRACT

Embodiments of the disclosure are directed toward a method, a system, and a computer program product for managing virtual storage access method (VSAM) data sets on performance tiers. The method can be used with VSAM data sets. The method can include determining a usage metric for a particular control area from the plurality of control areas. The method can also include prioritizing the particular control areas based on a determined usage metric. The method can also include assigning a prioritized control area to a performance tier of the plurality of tiers as a function of a prioritization of the particular control area and a performance criteria for the performance tier by moving the prioritized control area to the performance tier and updating an index record that associates the prioritized control area to the performance tier.

17 Claims, 7 Drawing Sheets

VSAM DATA SET TIER MANAGEMENT

FIELD

This disclosure generally relates to managing data sets, and in particular, to managing the placement of portions of data sets on storage tiers.

BACKGROUND

Modern storage tiering solutions can implement tiering at the volume level and usually within large storage servers using large chunks of data (256 MB and up). Due to the size of these chunks of data, a chunk can contain a large variety of data that can affect the overall usage of a block. The chunk can contain some data sets that are not highly accessed. For data sets that are not highly accessed, the access is affected because the entire block remains at a lower tier, when some of the data should be at a higher tier.

SUMMARY

Embodiments of a system and method are disclosed concerning the management of VSAM data sets.

One embodiment is directed toward a computer-implemented method for use with virtual storage access method (VSAM) data sets. Each data set has a plurality of control areas indexed to and stored on a plurality of tiers. The computer-implemented method can include determining a usage metric for a particular control area from the plurality of control areas. The computer-implemented method can also include prioritizing the particular control areas based on a determined usage metric. The computer-implemented method can also include assigning a prioritized control area to a performance tier of the plurality of tiers as a function of a prioritization of the particular control area and a performance criteria for the performance tier by moving the prioritized control area to the performance tier and updating an index record that associates the prioritized control area to the performance tier.

One embodiment is directed toward a system of moving one or more control areas in a virtual storage access method (VSAM) data set between performance tiers on one or more storage devices of a computing system. Each control area on the system can hold one or more control intervals in the computing system. The system can include one or more storage devices having a plurality of performance tiers configured to store one or more control areas. The system can also include an index record that associates, using a file system, a particular control area from the one or more control areas to a zero-level performance tier. The system can also include an access method configured to score the particular control area based on a usage. The access method can move the particular control area from the zero-level performance tier to a first-level performance tier as a function of the score. The access method can update the index record to point to the first-level performance tier in response to the moving of the control area.

Another embodiment is directed toward a computer program product.

BRIEF DESCRIPTION OF THE DRAWINGS

Like reference numbers and designations in the various drawings indicate like elements.

DETAILED DESCRIPTION

Aspects of the present disclosure are directed toward a method for assigning control areas to tiers with each tier having different performance characteristics. The method can be used with virtual storage access method (VSAM) data sets. Each data set can have a plurality of control areas indexed to and stored on a plurality of tiers. The method can determine a usage metric for a control area from the plurality of control areas. The method can prioritize the control area based on the determined usage metric. The method can also assign the control area to a tier of the plurality of tiers as a function of the prioritization of the control area and a performance criterion for the tier by moving the control area to the tier, and updating an index record that associates the control area to the tier. Although not necessarily limited thereto, embodiments of the present disclosure can be appreciated in the context of input methods and problems relating to selecting input methods.

In the following description, specific details of various embodiments are provided. However, some embodiments may be practiced with less than all of these specific details. In other instances, certain methods, procedures, components, structures, and/or functions are described in no more detail than is necessary to enable the various embodiments of the disclosure, for the sake of brevity and clarity.

As mentioned previously, data sets can be moved from one tier to another tier. However, in larger data sets, it can be advantageous to break the data sets into smaller "chunks" of control areas and update the location of the control areas using an index, e.g., an index record or control interval index. Throughout this disclosure, the term storage tier, and performance tier can be used interchangeably with tier to describe storage with partitions that vary from each other by performance.

Figure 1:
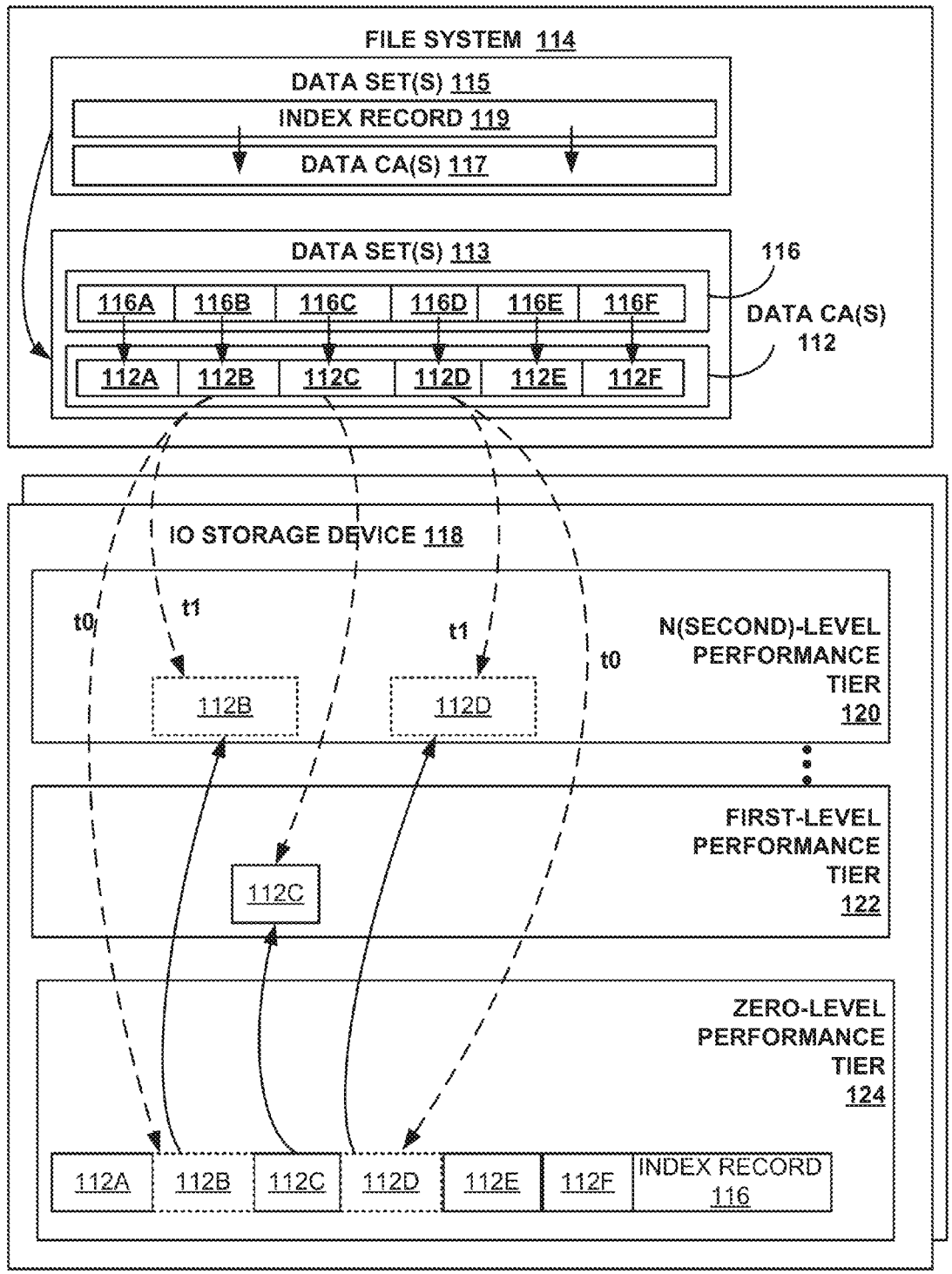
FIG. 1 depicts a block diagram of the interaction between a file system and an IO storage device, according to various embodiments.

FIG. 1 depicts a block diagram of the interaction between a file system 114 and an IO storage device 118, according to various embodiments.

In certain embodiments, the file system 114 is a software or logical mechanism to organize electronic content, e.g., such as files and data stored in the files on physical media, such as the input/output (IO) storage device 118. The file system 114 can be a part of an operating system and generally allows a user to find, search for, and access the files stored on the IO storage device 118. Hence, in general, the file system 114 is a database for the storage, hierarchical organization, manipulation, navigation, access, and retrieval of files and data associated with the files.

The data of the file system 114 can be stored on various IO storage devices including, but not necessarily limited to, a hard disk, a flash memory circuit. One or more of these devices can be accessible over a network, such as a local area network (LAN) using Ethernet of other communication protocols. The file system 114 may be used to access data from a data storage device such as a hard disk or compact disc read only memory (CD-ROM) and require the maintenance of the physical locations of the files. Additionally, the file system 114 may be used to access data on a file server, such as the computing system 402 of FIG. 4, by acting as a client for a network protocol. The file system 114 may also include a virtual filing system such as a process file system (procfs). The file system 114 can use one or more access methods to implement and interface with a particular storage system.

The file system 114 can contain one or more data sets, e.g., data set 115 and data sets 113. In various embodiments, data set 113 can be a part of the group of data sets 115. Any named group of records can be referred to as a data set. The data set 115 can be a logical structure of data. In various embodiments, data set 115 can hold information such as medical records or insurance records, to be used by a program running on the system. Data sets are also used to store information needed by applications or the operating system itself, such as source programs, macro libraries, or system variables or parameters.

In various embodiments, a Virtual Storage Access Method (VSAM) key sequenced data set (KSDS) can be used. VSAM KSDS records are data items that are stored with control information, or keys so that the system can retrieve an item without searching all preceding items in the data set. For example, the key could be a social security number, or a bank account that allows for the location of data depended on the key value. VSAM KSDS data sets can be used for data items that are used frequently and in an unpredictable order. The data set 113 and 115 can also be referred to generically as a file in various embodiments.

The data set, e.g., data set 115, can have an index record, e.g., index record 119, and a data control area, e.g., data control area 117. The index record 119 can contain indexed values that point to data control areas 117 stored on the IO storage device 118. The data set 113 can be structured similar to data set 115.

The data set 113 can have a data control area 112, and an index record 116. The data control area 112 can have control areas 112A, 112B, 112C, 112D, 112E, and 112F. A control area can be a subset of a data set 113 whose size is typically measured in tracks or cylinders. Control areas are the units of allocation so, when a VSAM data set is defined, an integral number of control areas will be allocated. The index record 116 can have index records 116A, 116B, 116C, 116D, 116E, and 116F. The index record 116 can record the physical location of a particular control area or a subset of a control area, e.g., a control interval, on a storage device, e.g., the input/output (IO) storage device 118, or a network storage device. An index record, e.g., index record 116A, can point to a data control area, e.g., 112A, stored on the IO storage device 118. In various embodiments, the index record 116 can be a control interval on the data set 113. An example of structure for a control area is described in connection with FIG. 2.

The IO storage device 118 can represent one or more IO storage devices. An IO storage device can include a solid state drive (SSD), a flash drive, a hard drive, optical storage, or other magnetic storage. The IO storage devices 118 can have a plurality of performance tiers. Examples of performance tiers include a zero-level performance tier 124, a first-level performance tier 122, and extending to an n-level performance tier 120 with the n being the highest number of performance tiers in the IO storage device 118. There may be any number of performance tiers between the n-level performance tier 120 and the first level performance tier 122. In the illustrated example, there are three performance tiers, a zero-level performance tier 124, a first-level performance tier 122, and a second-level performance tier 120. The second in parenthesis in the n-level performance tier 120 indicates that the n-level value is two for illustration purposes but could indicate any number n. In various embodiments, there can be as few as two different performance tiers.

The performance tiers can be differentiated from each other by various parameters, such as latency, access times, or transfer rates and as further described herein. The zero-level performance tier 124 can be considered a baseline or a default tier, according to various embodiments. The zero-level performance tier 124 can include lower performing IO storage devices 118 while the first-level performance tier 122 can include higher performance IO storage devices 118.

For example, the n-level performance tier 120 can be identified using the access speed of the underlying IO storage device 118 relative to other IO storage devices. For example, if a first IO storage device is an SSD with a transfer rate of 6 GB/s, and a second IO storage device is hard drive with a transfer rate of 3 GB/s, then the first IO storage device can be a first-level performance tier 122 and the second IO storage device can be a zero-level performance tier 124. The n-level performance tier 120 can be identified based on a particular volume or partition of the IO storage device 118. For example, if the IO storage device 118 has three partitions, with the first partition having the fastest access time, then the n-level performance tier 120 can be the first partition.

The IO storage devices 118 can have one or more volumes in the same drive. For example, in one IO storage device, it can be possible to have a first-level performance tier 122, and a zero-level performance tier 124 operating in two separate volumes. The IO storage device 118 can have any number of performance tiers. In the shown embodiment, the IO storage device 118 has a second-level performance tier 120, one first-level performance tier 122, and a zero-level performance tier 124. The performance tiers can be derived from the volumes on the IO storage device 118. In various embodiments, the n-level performance tier 120, the first-level performance tier 122, and the zero-level performance tier 124 are on separate IO storage devices 118.

The n-level performance tier 124 can be a high performance tier with n representing the number of performance tiers in the IO storage devices 118. In various embodiments, there may be two or more performance tiers (e.g., it is possible to have 100 performance tiers or more). The number of tiers in the IO storage device 118 can be dependent on the number of IO storage devices, partitions, or volumes. For example, if there are only three volumes, then a second-level performance tier, a first-level performance tier, and a zero-level performance tier can exist.

A greater number of IO storage devices, partitions, or volumes can lead to increased numbers of tiers. For example, the n-level performance tier 124 can represent more than one tier. If there are ten IO devices, there can be one ninth-level performance tier, and one zero-level performance tier 124. In some instances, certain groups of multiple IO storage devices, partitions, or volumes can be grouped into a common tier, while one or more other devices, partitions or volumes are grouped in another tier.

In certain embodiments, the data set 113 is read from the file system 114. As an initial state, the data control areas 112A through 112F are stored on the zero-level performance tier 124 at time t0 in an IO storage device 118. The index record 116 can also be stored in the zero-level performance tier 124 or in the memory 412 from FIG. 4 for faster access. As the control area 112C is promoted to the first-level performance tier 122, the location is updated in the index record 116 of the file system. As the control areas 112B and 112D are promoted to the second-level performance tier 120, the location is updated in the index record 116 at time t1. When a read or write operation is required to be performed on 112B, the index record 116 can be used to locate the control area 112B now on the second-level performance tier 120 of IO storage device 118. The file system 114 may then read or write the data on the control area 112B.

The control areas 112A-112F can be allocated to performance tiers in multiple ways. In various embodiments, a particular performance tier can be at capacity and not be allowed to store any additional control areas. In such cases, a control area that would otherwise be allocated to the particular performance tier can be moved to either a higher or lower performance tier depending on applications preferences, which can be determined by a user, and the remaining capacity of the various performance tiers.

Figure 2:
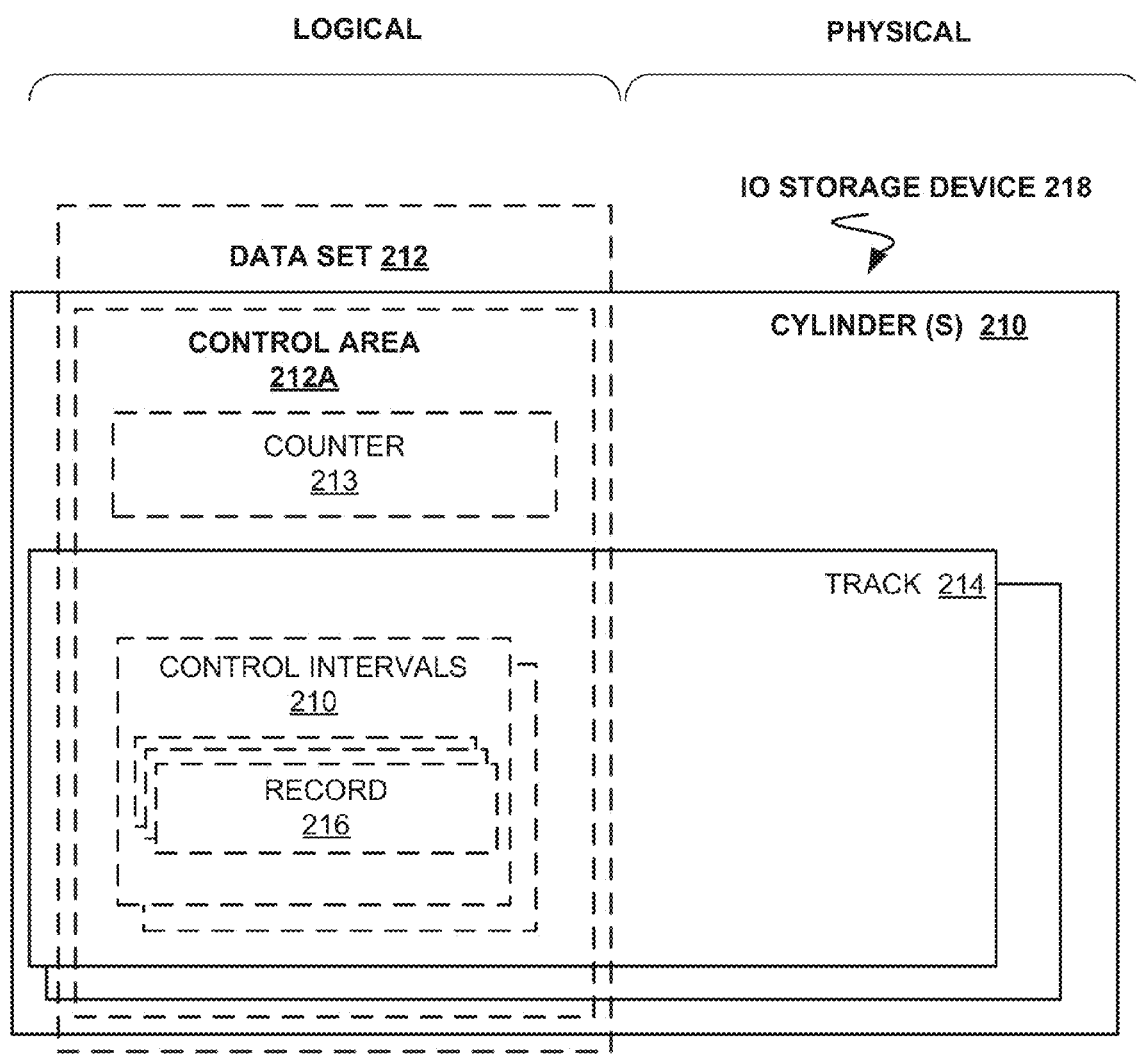
FIG. 2 depicts a block diagram of a control area according to various embodiments.

FIG. 2 depicts a block diagram of a control area 212A, according to various embodiments. The control area 212A can correspond to one or more of the control areas from FIG. 1. The control area 212A can be a part of the data set 212. The data set 212 can correspond to a data set from FIG. 1. The data set 212 can be mapped to the IO storage device 218 using a file system. The data set 212 is depicted as logical elements with dashed lines while the IO storage device 218 is depicted as physical elements with solid lines.

As shown, the data set 212 corresponds to physical storage on an IO storage device 218. The IO storage device 218 can include one or more cylinders 210. Each cylinder 210 can include one or more tracks 214. Data sets can also be stored on IO storage devices without cylinders and tracks, such as solid-state drives (SSD) and other devices.

A file system can map control areas to the IO storage device 218. For example, the control area 212A can correspond to one or less than one cylinder 210 and the control area 212A can refer to 1, 3, 5, 7, 9 or 15 tracks. Each track 214 can have one or more control intervals 210. The number of control intervals 210 per control area 212A depends on how much space is reserved when the data set 213 is created. Control intervals 210 can have a fixed data size of 4 kb, according to various embodiments. In one example, when the dataset is 4000 kb, and each control interval 210 is 4 kb, then there may be 1000 control intervals 210 that can be allocated into 100 control areas. The control interval 210 can contain a number of records 216. Each record 216 can be a data value that is recorded.

The counter 213 can keep track of the number of times that a control area 212A is accessed. Each control area can have a separate counter 213. The counter 213 can record the number of times the control area 212A is accessed to aid in the determination of whether the control area belongs in a first-level performance tier 122 or a zero-level performance tier 124. The counter 213 can be loaded onto a memory. In various embodiments, the counter 213 from each control area can be tabulated and tracked by an access method module.

Figure 3:
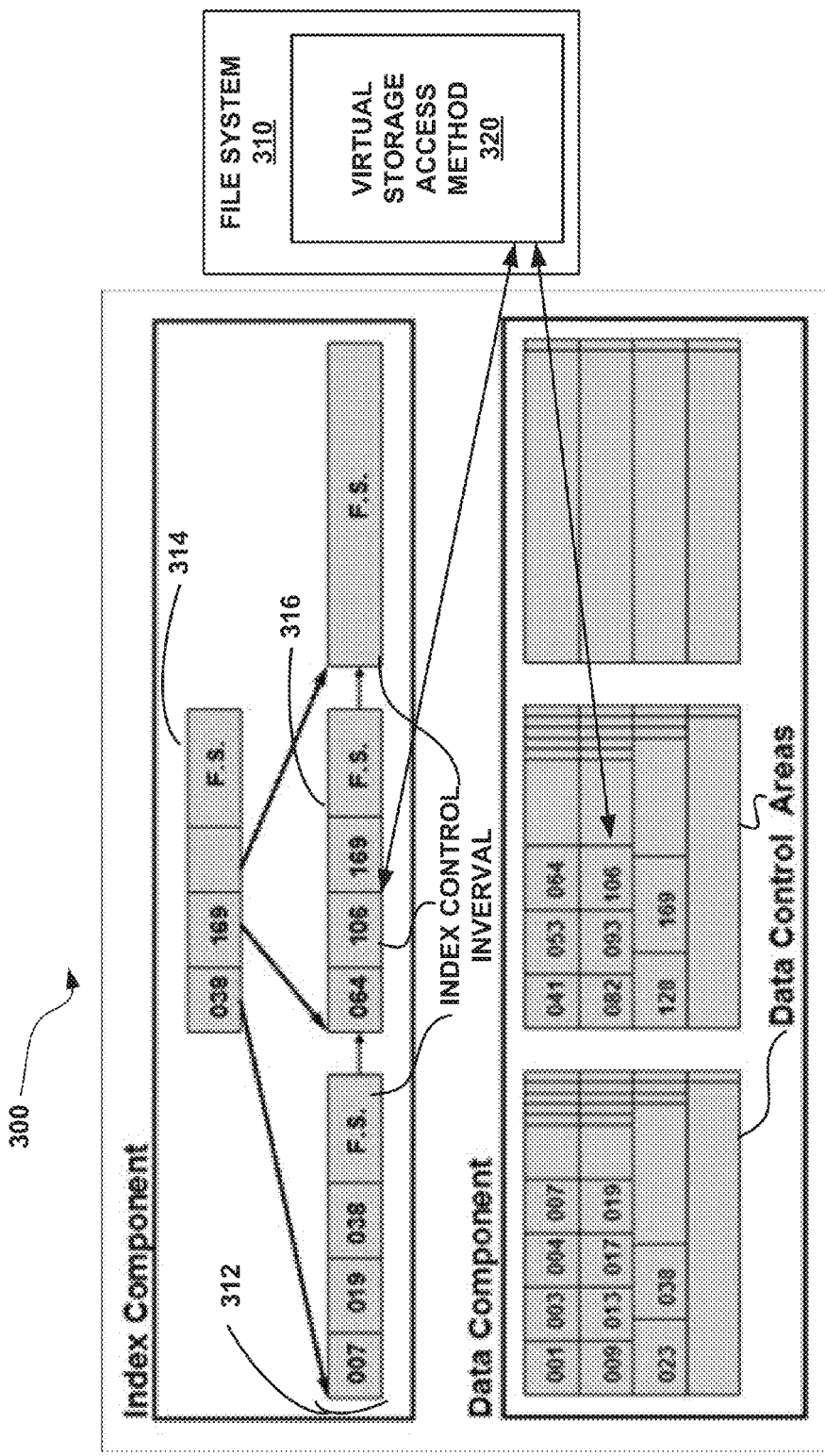
FIG. 3 depicts a block diagram of a key-sequenced data set system, according to various embodiments.

FIG. 3 depicts a block diagram of a key-sequenced data set system 300, according to various embodiments. The system 300 represents a logical data structure that interacts with a file system 310. The file system 310 can correspond to the file system 114 in FIG. 1. The file system 310 can employ an access method to organize the data. For example, the access method can be a virtual storage access method (VSAM) using a key-sequenced data set. The system 300 depicts an index component containing one or more index control intervals which can correspond to the index record 116 found on FIG. 1. The two data control areas are already filled with control intervals. The system 300 shows two index control intervals in the index sequence set 312, which is the lower level of the index component.

To illustrate the operation of the system 300, the following example can be used. If an application searches for a data record with key equal to 093, the search sequence set can reads the top index control interval record 314. The value 093 is larger than 038, but is smaller than 169. The index record 314 that shows key 169 has a relative byte address (RBA) of an index control interval 316 in the sequence set 312. The index control interval 316 is read. The value 093 is larger than 064, but it is smaller than 106. The VSAM 320 can read the index record 316 that shows key 106 has the RBA of a data control interval in the data component. The data control interval can be read by the VSAM 320. The value 093 is larger than 082, and so the data record 093 is found.

Figure 4:
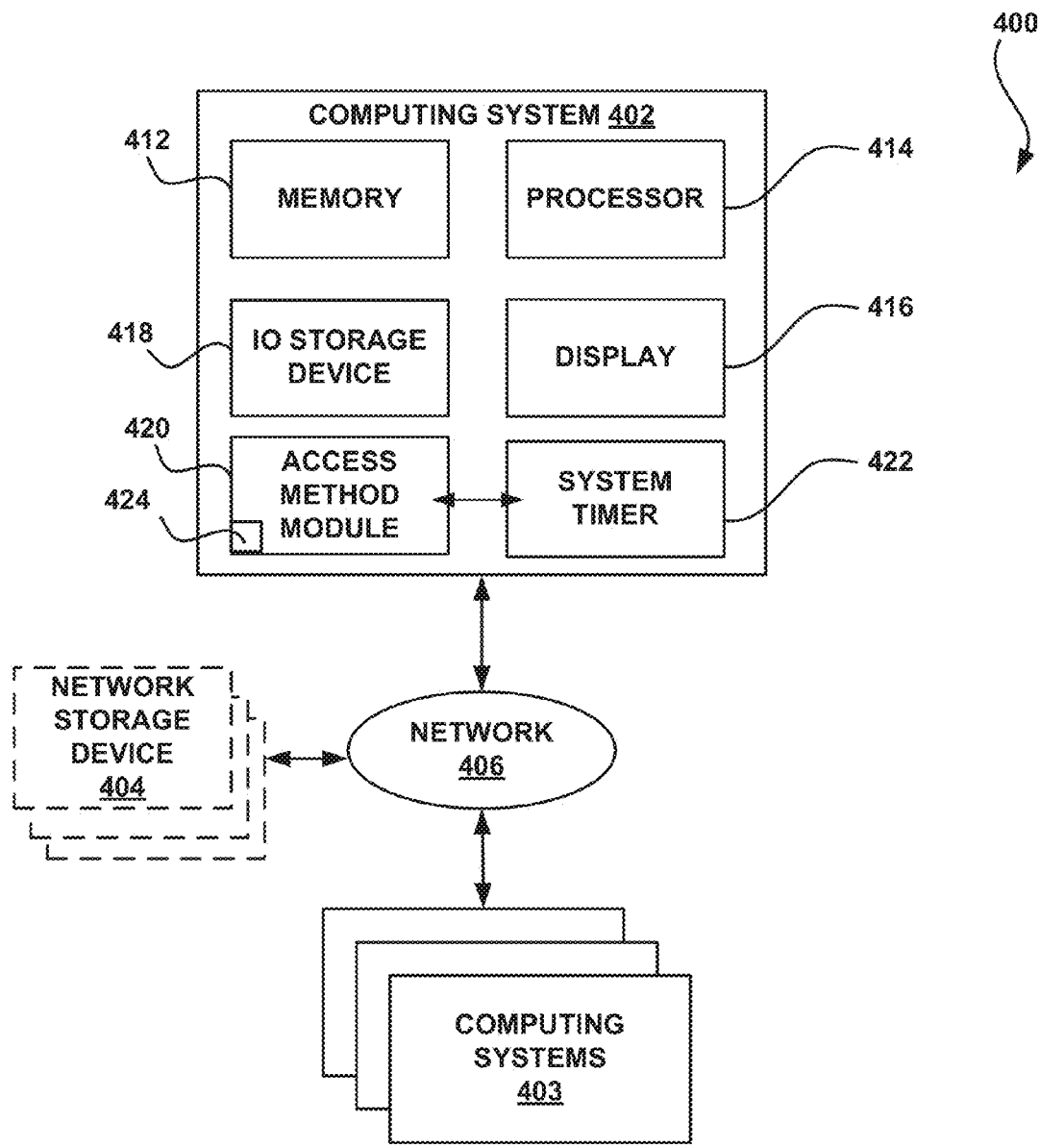
FIG. 4 depicts a block diagram of a system configured to move control areas to storage tiers, according to various embodiments.

FIG. 4 depicts a block diagram of a system 400 configured to move control areas to storage tiers, according to various embodiments. As depicted, the system 400 may include a computing system 402, one or more computing systems 403, one or more network storage devices 404 and a network 406. The computing systems 402, 403, can connect to each other and the network storage devices 404 through the network 406. A computing system 402 can share resources with any other computing systems 403 through the network 406. For example, the computing system 402 can share the IO storage devices 118 with another computing system 403. In various embodiments, the network storage devices 404 can be a Redundant Array of Independent Disks (RAID) or an external array of storage drives. The network storage devices 404 can represent a cloud storage device. The computing system 402 may be a part of the computing systems 403 and may be used interchangeably throughout this disclosure.

The computing system 402 may provide an interface between the user and network storage device 404. In certain embodiments, the computing system 402 is a desktop, or laptop computer. In various embodiments, the computing system 402 is a mobile computing device that allows a user to connect to and interact with an application running on another computing system 403 or a network storage device 404. The computing system 402 can connect to other computing systems 402 or network storage devices 404 via a local area network (LAN) or other similar network 406.

The network 406 may communicate block level input/output (I/O) protocols, such as with the network storage device 404 over a storage area network (SAN). The network 406 may also communicate file level I/O protocol, such as over a transmission control protocol/internet protocol (TCP/IP) network or similar communication protocol. In some embodiments, the system 400 comprises two or more networks 406. Alternatively, the computing system 402 may be connected directly to the computing system 402 via a backplane or system bus. Consistent with embodiments of the present disclosure, the network 406 may include a cellular network, other similar type of network, or combination thereof.

The computing system 402 can include the memory 412, a processor 414, the IO storage device 418, a display 416, the access method module 420, and a system timer 422. Each computing system 402 can have similar components. Components of the computing system 402 can have a similar function within the system 400.

The system 400 may allow a user to interface with the computing system 402. In one configuration, one computing system 402 is a server and another computing system 403 is a client computer. In another configuration, the computing system 402 may be a partition of a larger computer such as a virtualization scheme. Although the depicted system 400 is shown and described herein with certain components and functionality, other embodiments of the system 400 may be implemented with fewer or more components or with less or more functionality. For example, some embodiments of the system 400 may not include a network 406 and a network storage device 404.

In various embodiments, the memory 412 is a random access memory (RAM) or another type of dynamic storage device. In other embodiments, the illustrated memory 412 is representative of both RAM and static storage memory within the system 400 from FIG. 4. The memory 412 may store operations and functions associated with the generation of the file as well as a save operation to save the file to the memory 412. The memory 412 can temporarily store program elements, e.g., the index record 116 or the file system 114 from FIG. 1 in order to increase the read and write times.

In various embodiments, the processor 414 is a central processing unit (CPU) with one or more processing cores. In various embodiments, the processor 414 is a graphical processing unit (GPU) or another type of processing device such as a general purpose processor, an application specific processor, a multi-core processor, or a microprocessor. Alternatively, a separate GPU may be coupled to the display device 416. In various embodiments, the display device 416 is a graphical display such as a cathode ray tube (CRT) monitor, a liquid crystal display (LCD) monitor, or another type of display device. In various embodiments, the display device 416 can be used to visually communicate aspects of this disclosure with a user. The display device 416 can be optional. In general, the processor 414 executes one or more instructions to provide operational functionality to the system 100. The instructions may be stored locally in the processor 414 and/or in the memory 412. Alternatively, the instructions may be distributed across one or more devices such as the processor 414, the memory 412, or another data storage device.

The IO storage device 418 can correspond to the IO storage device 118 in FIG. 1. Generally, the IO storage device 418 can be a device that stores data and can include a hard drive, or a solid state disk. A file system can refer to data stored on the IO storage device 418.

An access method module 420 can control the management of files on a file system. In various embodiments, the access method module 420 may be stored at a location accessible via the network 406.

The access method module 420 defines the technique that is used to store and retrieve data used by the file system. The access method module 420 can have internal data set structures to organize data, system-provided programs (or macros) to define data sets, and utility programs to process data sets 113. Access method modules 420 are identified primarily by the data set organization. For example, a Virtual Storage Access Method (VSAM) can arrange records by an index record, relative record number, or relative byte addressing. VSAM is used for direct or sequential processing of fixed-length and variable-length records on a direct access storage device. Data that is organized by VSAM can be cataloged for easy retrieval.

The access method module 420 can further include a sorter 424. The sorter 424 can be responsible for sorting the control areas based on the usage. For example, the sorter 424 can receive the usage data from the counter 213 and rank the control areas 112A-F accordingly.

The processor 414 may maintain the system timer 422. The system timer synchronizes the clock for the computing system 402. The system timer 422 can also be used in conjunction with the access method module 420 to measure the amount of time that lapses between the accessing of a particular control interval. In various embodiments, the access method module 420 can capture the time to a time stamp from the system timer 422. The time stamp can be accessed by the file system 114 from FIG. 1. In various embodiments, the system timer 422 can be used to determine the access speeds of IO storage device 418.

Figure 5:
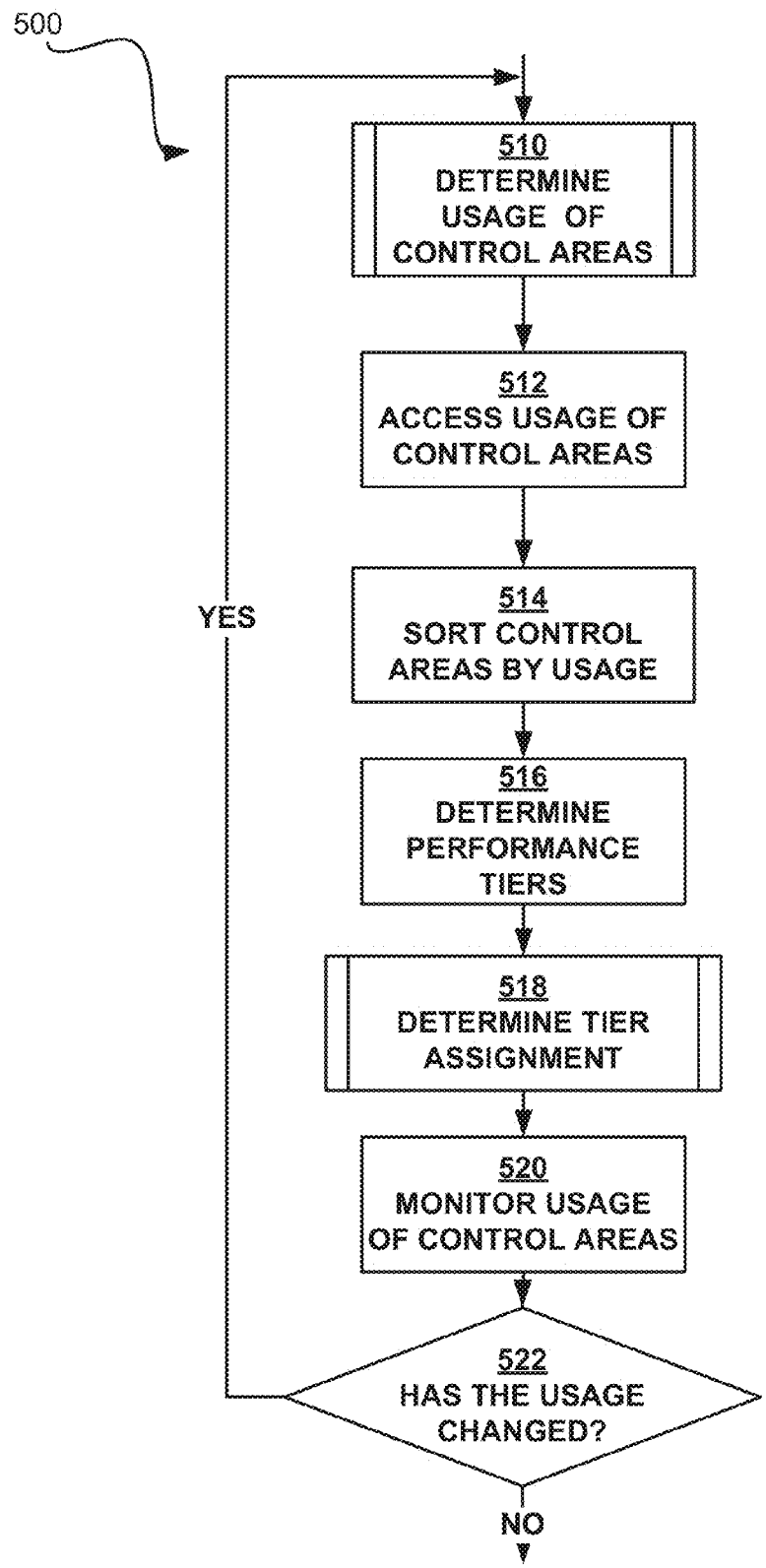
FIG. 5 depicts a high-level flowchart of a method of assigning control areas to performance tiers, according to various embodiments.

FIG. 5 depicts a high-level flowchart of a method 500 of assigning control areas to performance tiers, according to various embodiments. The method 500 can begin at operation 510 where the usage of the control areas is determined. The usage of a particular control area can be measured based on the number of times that a control area is read and written. Operation 510 can also avoid measuring usage of data that has become stale. Data usage can be considered stale when a duration is above a duration threshold. The duration can be the time between when a particular control area is used. As mentioned above, the usage of the control area can be recorded by the counter 213. Operation 510 will be discussed further herein.

The method 500 can proceed to operation 512 after the usage of control areas is determined. The counter 213 can transmit the usage of the control area to the access method module 420. The access method module 420 can track the usage of all of the control areas. In operation 512, the access method module 420 can access the usage of the control areas by accessing the counter 213 on each control area. Again, the usage can be the amount of times a particular control area is read and written. After the usage of the control areas are accessed, then the method 500 can proceed to operation 514.

In operation 514, the control areas can be sorted by the usage by the sorter 424 or other components of the access method module 420. In various embodiments, the sorter 424 can rank the control areas as a function of the score. For example, if a first control area has a usage score of 150, a second control area has a usage score of 133, and a third control area has a usage score of 156, the third control area can be ranked above the first control area, which can be ranked above the second control area. The rank can be stored temporarily on a buffer or cache and can be updated in real time. In various embodiments, the rank can be stored in a file on an IO storage device. The ranking of the control areas can then be used to assign the control areas to performance tiers. After the control areas are sorted by usage, then the method 500 can proceed to operation 516.

In operation 516, the performance tiers can be determined based on performance criteria of the IO storage device 118 determined by the application or user. The performance tier can be associated with a particular IO storage device 118, network storage device 404, or any partition or volume thereof, which will be referred to generically as an IO storage device 118. The performance criteria can be any measurement that quantifies performance of one performance tier relative to another performance tier. For example, the performance criteria can be a transfer rate, a CPU or other system impact, or (network) latency. In various embodiments, the transfer rate can be tested by observing past instances of transfers between IO storage devices 118 or by using a test file to determine the transfer rate for one or more of the IO storage devices 118.

In various embodiments, the determination of the performance tier can occur based on ranges of the performance criteria. For example, the user can indicate that a range of anything above 6 Gb/s can be associated with the first-level performance tier 122, while a range of anything below 6 Gb/s can be associated with the zero-level performance tier 124.

IO storage devices can also be ranked in operation 516 For example, if there are four IO storage devices, the performance criteria, e.g., transfer rate, can be used to assign each IO storage device into a performance tier. In the above example, the IO storage device 118 having the fastest transfer rate can be associated with the first-level performance tier 122 and the IO storage device 118 having the slowest transfer rate can be associated with the zero-level performance tier 124. After the performance tiers are measured in operation 516, then the method 500 can proceed to operation 518.

In operation 518, the control areas can be assigned to performance tiers based on their usage. In certain embodiments, the control areas with a higher usage are moved from lower performance tiers to higher performance tiers. Operation 518 is further described herein. After the control areas are assigned to performance tiers, then the method 500 can proceed to operation 520.

In operation 520, the access method module 420 can continue to monitor for changes to control areas and performance tiers. The changes can include an increase or decrease in the count, or score of a control area or changes in the performance tier, e.g., an increase or decrease in the transfer rate of the performance tier. After the usage of control areas and performance tiers are monitored, the method 500 can continue to operation 522.

In operation 522, the access method module 420 can determine whether the control area or performance tier has changed. If the control area has changed, then the method 500 can proceed to operation 510. In various embodiments, the determination whether the control area has changed can be defined for a particular time period. For example, the access method module 420 can monitor the IO storage devices 118 or file system 114 over four hours. If the control area has not changed with in the four hours, then the method 500 can stop.

Figure 6:
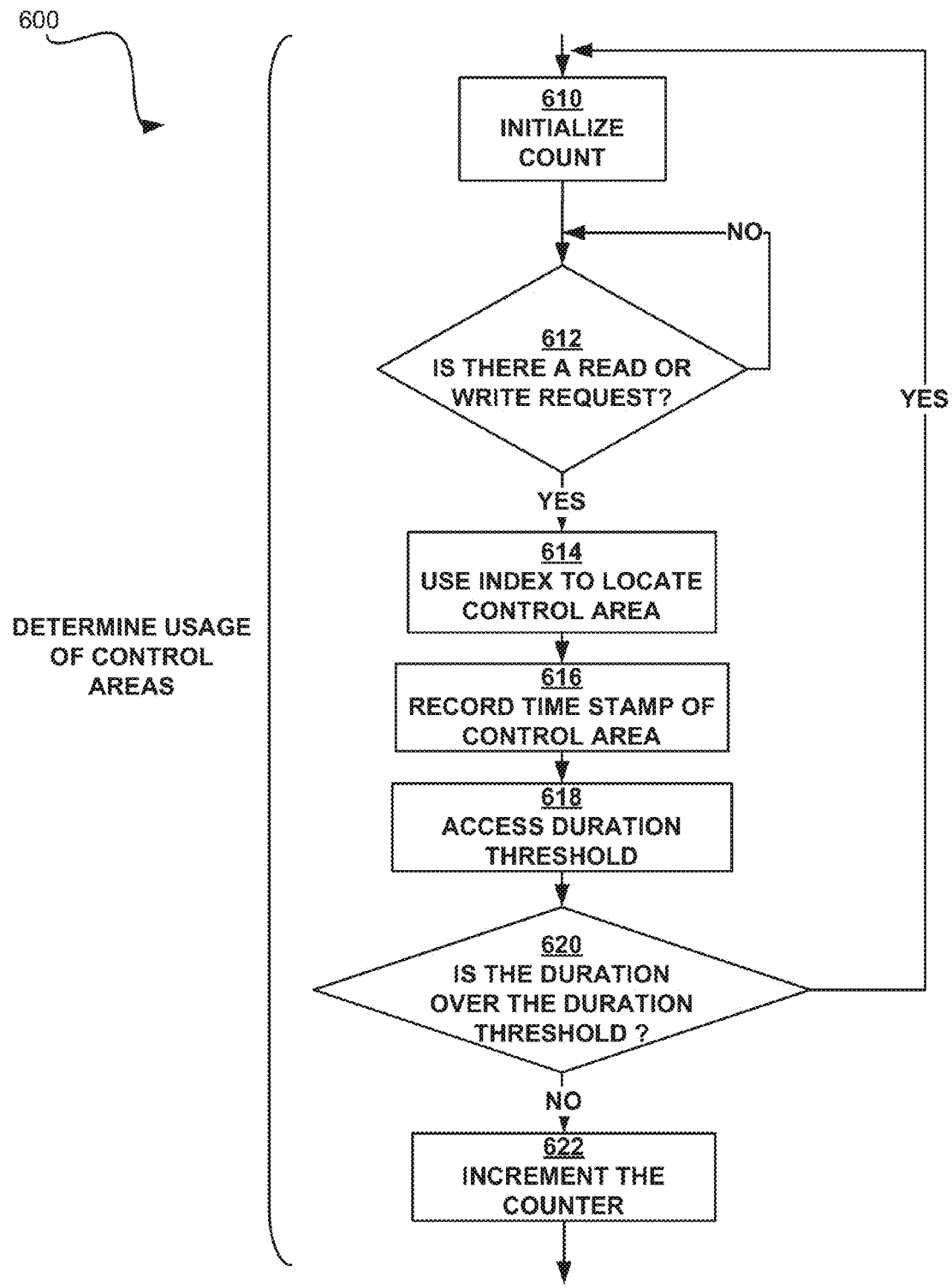
FIG. 6 depicts a flowchart of a method of determining usage of control areas, according to various embodiments.

FIG. 6 depicts a flowchart of a method 600 of determining usage of control areas, according to various embodiments. In various embodiments, the usage can be determined one control area at a time. Method 600 can correspond to operation 510 from FIG. 5. Method 600 can begin at operation 610 where a count is initialized. The access method module 420 can initialize the count by setting the counter 213 to zero. Operation 610 can involve setting a count for the usage to zero. In various embodiments, the count is initialized by starting the computing system 400.

After the count is initialized, then the method 600 can proceed to operation 612. In operation 612, a file system can use the access method module 420 that has an access method to determine whether there is a read or write request. In various embodiments, the access method module 420 can receive a request from an IO storage device controller on the computing system 400 for the control area. In various embodiments, another application on the computing system 400, such as a database program, can request access to the control area. If there is not a request for the control area, then there is not a usage to count and the method 600 continues to monitor for a read or write request. If there is a read or write request, then the method 600 can continue to operation 614.

In operation 614, the access method module 420 can use the file index record 116 to locate the physical location of the control area on the IO storage device 118. In various embodiments, the control area may encompass one or more cylinders or tracks on the IO storage device. Once the control area is located, the method 600 can proceed to operation 616.

In operation 616, the access method module 420 can work with the system timer 420 to determine a time stamp for an access to the control area. The time that the control area is accessed can be saved by the counter 213. For example, if a control area is accessed, then the access method module 420 can refer to the system timer 420 to determine the time that the control area is accessed. The access method module 420 can then give the time to the counter 213 and the counter 213 can include the timestamp to indicate the time that the control area was accessed. In various embodiments, the time that the control area is accessed can be separate from the actions of the counter 213. The time stamp can be stored in the control area and accessed via the memory 412. After the time stamp of the control area is recorded, then the method 600 can proceed to operation 618.

In operation 618, the duration threshold can be access. The duration threshold represents that amount of time before the access becomes stale. For example, if a control area is accessed every 20 minutes, then the low frequency of access can weigh against moving the control area to a different performance tier. In various embodiments, the duration threshold can be set by an application or the user. The duration between accesses to a control area can be the difference between the between the last read or write request and the current read or write request. The duration threshold can be determined by the application or user and stored in the access method module 420. After operation 618, the method 600 can proceed to operation 620.

In operation 620, the access method module 420 can compare the duration threshold to the duration of the control area. If the duration threshold is less than the duration, then the method 600 can continue to operation 610, where the count and time is initialized for the control area that is examined. If the duration threshold is greater than the duration, then the method 600 can proceed to operation 622. For example, if the duration is 13 minutes, and the duration threshold is 15 minutes, then operation 618 continues to operation 622.

In operation 622, the counter 213 of the control area is incremented. For example, the counter 213 can be incremented based off of a single write request or a single read request. If there is a simultaneous write and read request, then the counter 213 can be incremented twice. The value on the counter 213 can correspond to the usage, which can be the amount of times a particular control area is read and written. The usage can produce a usage score depending on the weights of the counts. For example, the user may give more weight to a read than a write operation in a control area. The score can represent the aggregate of the counts. For example, assuming equal weights, if a first control area has been read four times and written six times, and a second control area has been read six times and written to seven times, then the first control area could have a usage score of ten, and the second control area could have a usage score of thirteen. After the counter 213 is incremented, then the method 600 can continue to operation 512 in FIG. 5.

Figure 7:
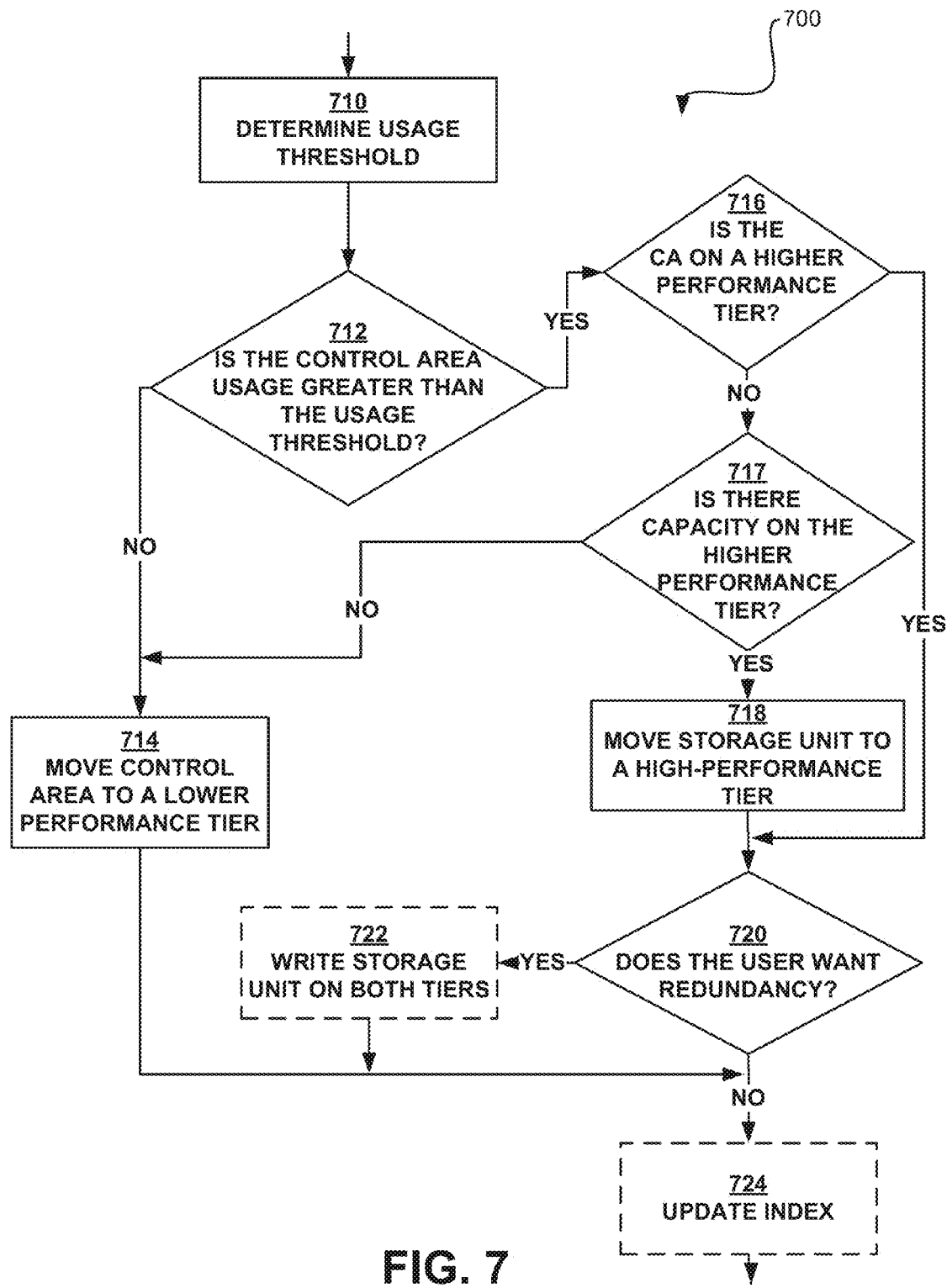
FIG. 7 depicts a method of a control area being assigned to a performance tier, according to various embodiments.

FIG. 7 depicts a method 700 of a control area being assigned to a performance tier, according to various embodiments. The method 700 can correspond to operation 518 from FIG. 5. The method 700 can begin at operation 710. In operation 710, a usage threshold can be determined for the control areas which can be used to move the control area to a different performance tier. The usage threshold can be determined by the application or user.

In various embodiments, the usage threshold can be established based on the number of control areas in the computing system 400. For example, if there are two million control areas and the first-level performance tier is able to hold 500,000 control areas, then the usage threshold can be equal or greater than the usage of the control area ranked 500,000th out of two million. Therefore, if the 500,000th control area has a usage score of 300,000, then the threshold is 300,000 and control areas with usage above 300,000 can be moved to the first-level performance tier.

The usage threshold can be determined for each performance tier. In the above example, if there are both a first-level performance tiers and a second-level performance tier between the third-level (high) performance tier and zero-level performance tiers (four total), then the third-level (high) performance tier is able to hold 500,000 control areas, the zero-level performance tier is able to hold 250,000 control areas, and the first and second performance tiers are able to hold 1,250,000 control areas, or 625,000 control areas each. In this example, the usage threshold for the zero-level performance tier can be the usage score for the 1,750,001st control area, the usage threshold for the first-level performance tier can be the usage score for the 1,125,001st control area, and the usage threshold for the second-level performance tier can be the usage score for the 500,001st control area.

In various embodiments, the usage threshold can be changed in response to new parameters. In the above example, if the usage of the 500,000th control area changes due to increased access, then the threshold may adjust accordingly. In another example, if the third-level performance tier is no longer available, but first-level performance tier and second-level performance tier are available, the threshold can adjust to accommodate moving a control area to a lower performance tier.

In operation 710, the usage threshold can be a rank threshold. The sorting of control areas can occur in operation 514. The access method module 420 can use the rank of a control area as a threshold. For example, if the capacity of the IO storage device 118 corresponding to the first-level performance tier will hold 500,000 control areas, then the access method module 420 can determine that the threshold is the first 500,000 control areas. After the usage threshold is determined, then the method 700 can continue to operation 712.

In operation 712, the access method module 420 can compare the usage of the control area to the usage threshold for the performance tier. Operation 712 can be dependent on usage threshold used. For example, if the usage threshold is a rank threshold, then a rank of less than the rank threshold would move the control area to a higher performance tier. If the usage threshold is based off of the usage score, then the usage score of the control area should be greater than usage threshold. In the shown embodiment, the access method module 420 can determine if the usage of the control area is greater than the usage threshold.

If the usage is not greater than the usage threshold, then the method 700 can proceed to operation 714. In operation 714, the control area can be moved to a lower performance tier if required. For example, using the 2 million control area example, if the control area has a usage score corresponding to the 1,7600,000th control area and the control area is in the zero-level performance tier, then the control area does need to be moved. However, if the control area has a usage score corresponding to the 1,000,000th control area and is located in the third-level performance tier, then the control area can be moved to the second-level performance tier. In various embodiments, the control area can be moved to the lowest performance tier available and promoted in a later cycle. If the control area is at the appropriate performance tier, then the method 700 can proceed to operation 724.

If the usage is greater than the usage threshold, then the method 700 can continue to operation 716. Operation 716 can determine whether the control area is already located on a higher performance tier. For example, if the usage corresponds to the n-level performance tier 120, and the control area is located on the zero-level performance tier 124, then the result is a negative and the method 700 continues to operation 717. However, if the usage corresponds to a 2nd performance tier (using the above example), and the control area is located in the 2nd performance tier, then the result is affirmative and the method 700 continues to operation 720.

In operation 717, the access method module 420 can determine if there is any capacity on the higher performance tier. If the control area is moved to a higher performance tier, then the access method module 420 can ensure that there is enough free space on the higher performance tier. For example, if the capacity of a n-level performance tier 120 is 4 GB with free space of 0.2 GB, and a control area to be moved has a size of 0.3 GB, then the method 700 can continue to operation 714. If the higher performance tier has the capacity, then the method 700 can continue to operation 718.

Although shown as sequential steps, operations 718, 720, 722, and 724 can occur simultaneously. In operation 718, the access method module 420 can move the control area to a higher performance tier than the tier the control area was previously located. In operation 720, the access method module 420 can determine whether the user wants redundancy, where the control area is retained in two performance tiers.

If the user does want redundancy, then the method 700 continues to operation 722. In operation 722, the control areas can be copied to both performance tiers. In various embodiments, the pointers can be retained in the index record 116 for both the old location and the new location for the control area.

If the user does not want redundancy, then the method 700 can continue to operation 724. In operation 724, the access method module 420 can update the index record 116 for the data set 113 with the location. For example, if the control area is moved from the zero-level performance tier 124 to the n (second)-level performance tier 120, then the index record 116 can be updated so that when the access method module 420 reads the index record 116, the control area is shown on an address on the n (second)-level performance tier 120. After operation 724, then the method 700 can continue to operation 520 on FIG. 5.

Embodiments of the disclosure can take the form of an entirely hardware embodiment, an entirely software embodiment, or an embodiment containing both hardware and software elements. In one embodiment, the disclosure is implemented in software, which includes but is not limited to firmware, resident software, microcode, etc.

Furthermore, embodiments of the disclosure can take the form of a computer program product accessible from a computer-usable or computer-readable storage medium providing program code for use by or in connection with a computer or any instruction execution system. For the purposes of this description, a computer usable or computer readable storage medium can be any apparatus that can store the program for use by or in connection with the instruction execution system, apparatus, or device.

The computer-useable or computer-readable storage medium can be an electronic, magnetic, optical, electromagnetic, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/Write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which may provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the disclosure have been described and illustrated, the disclosure is not to be limited to the specific forms or arrangements of parts so described and illustrated. The scope of the disclosure is to be defined by the claims appended hereto and their equivalents.

What is claimed is:

1. A computer-implemented method for use with virtual storage access method (VSAM) data sets with each data set having a plurality of control areas indexed to and stored on a plurality of performance tiers, the computer-implemented method comprising:
    determining a usage metric for one or more particular control areas from the plurality of control areas, said usage metric determining including determining whether a duration between a first access and a second access at each particular control area is within a duration threshold, said determining comprising: implementing a counter to count access usage of a particular control area to determine the usage metric, wherein when a duration between a first access and a second access for the particular control area is within the duration threshold, then incrementing the counter for that control area;
    prioritizing the one or more particular control areas based on the determined usage metric; and
    assigning a prioritized control area of said one or more particular control areas to a performance tier of the plurality of performance tiers as a function of a prioritization of the particular control area and a performance criteria for the performance tier by:
        moving the prioritized control area to the performance tier; and
        updating an index record that associates the prioritized control area to the performance tier.

2. The computer-implemented method of claim 1, wherein the determining the usage metric includes determining a number of accesses that correspond to the particular control area.

3. The computer-implemented method of claim 2, further including determining the number of accesses when said duration for said control area is within said duration threshold in response thereto.

4. The computer-implemented method of claim 1, wherein prioritizing the one or more particular control areas includes:
    ranking particular control areas in response to a determined usage metric; and
    selecting a prioritized control area as a function of the ranking.

5. The computer-implemented method of claim 1, wherein assigning the prioritized control area to a performance tier of the plurality of tiers includes:
    determining the performance tier from the plurality of performance tiers by:
        measuring the performance criteria of each performance tier;
        ranking the plurality of performance tiers as a function of the performance criteria; and
        determining a usage threshold for the performance tier as a function of the ranking.

6. The computer-implemented method of claim 5, wherein assigning the prioritized control area includes moving the prioritized control area to the performance tier in response to the prioritized control area falling within the usage threshold.

7. A computer program product for using with virtual storage access method (VSAM) data sets with each data set having a plurality of control areas indexed to and stored on a plurality of tiers, the computer program product comprising a computer readable storage medium having program code embodied therewith, the program code comprising computer readable program code configured to:
    determine a usage metric for one or more particular control areas from the plurality of control areas, said usage metric determining including determining whether a duration between a first access and a second access at each particular control area is within a duration threshold wherein to determine a usage metric comprises: implementing a counter to count access usage of a particular control area, wherein when a duration between a first access and a second access for the particular control area is within the duration threshold, then incrementing the counter for that control area;
    prioritize the one or more particular control areas based on the determined usage metric; and
    assign a prioritized control area of said one or more particular control areas to a performance tier of the plurality of tiers as a function of a prioritization of the particular control area and a performance criteria for the performance tier by:
        moving the prioritized control area to the performance tier; and
        updating an index record that associates the prioritized control area to the performance tier.

8. The computer program product of claim 7, wherein determine a usage metric includes a determination of a number of accesses that correspond to the particular control area.

9. The computer program produce of claim 8, further including determining the number of accesses when said duration for said control area is within said duration threshold in response thereto.

10. The computer program product of claim 7, wherein to prioritize the one or more particular control areas includes:
    ranking particular control areas in response to the determined usage metric; and
    select a prioritized control area as a function of the ranking.

11. The computer program product of claim 7, wherein to assign the prioritized control area to a performance tier of the plurality of tiers includes:
    determine the performance criteria of the performance tier by:
        measuring the performance criteria of each performance tier;

ranking the plurality of performance tiers as a function of the performance criteria; and
determining a usage threshold for the performance tier as a function of the ranking.

12. The computer program product of claim 11, wherein the assign the prioritized control area to the performance tier further includes move the prioritized control area to the performance tier in response to the prioritized control area falling within the usage threshold.

13. A system of moving one or more control areas in a virtual storage access method (VSAM) data set between performance tiers on one or more storage devices of a computing system, each control area holding one or more control intervals in the computing system, the system comprising:
one or more storage devices having a plurality of performance tiers configured to store one or more control areas;
an index record that associates, using a file system, a particular control area from the one or more control areas to a zero-level performance tier; and
an access method configured to:
implement a counter to track access usage of a particular control area;
score the particular control area based on a usage, a usage determined by whether a duration between a first access and a second access at the particular control area is within a duration threshold, wherein when a duration between the first access and the second access for the particular control area is within the duration threshold, then incrementing the counter for that control area for said usage tracking;
move the particular control area from the zero-level performance tier to a first-level performance tier as a function of the score; and
update the index record to point to the first-level performance tier in response to the moving of the control area.

14. The system of claim 13, wherein the access method is configured to receive the usage from the counter for particular control area.

15. The system of claim 13, wherein the first-level performance tier has a performance criteria greater than the zero-level performance tier.

16. The system of claim 15, wherein the performance criteria is a transfer rate.

17. The system of claim 13, wherein the access method is configured to:
record a duration between the first access and the second access of the particular control area; and
avoid incrementing the counter in response to the duration being above a duration threshold.

* * * * *